(12) United States Patent
Hiramatsu (10) Patent No.: US 6,212,407 B1
(45) Date of Patent: Apr. 3, 2001

(54) SPREAD-SPECTRUM TRANSMITTER AND RECEIVER PROVIDING SUPPRESSED INTERFERENCE BETWEEN HIGH-SPEED AND LOW-SPEED COMMUNICATION USERS

(75) Inventor: Katsuhiko Hiramatsu, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/990,020

(22) Filed: Dec. 12, 1997

(30) Foreign Application Priority Data

Dec. 25, 1996 (JP) .................................................. 8-355834

(51) Int. Cl.⁷ ........................................................ H04B 1/38
(52) U.S. Cl. ...................... 455/562; 455/448; 455/277.1; 370/335; 343/725; 343/893
(58) Field of Search .................................... 455/561, 562, 455/423, 425, 25, 132, 133, 134, 135–138, 139, 140, 101, 103, 337; 375/200–208

(56) References Cited

U.S. PATENT DOCUMENTS

| | | | |
|---|---|---|---|
| 5,400,359 | * 3/1995 | Hikoso et al. | 375/202 |
| 5,408,679 | * 4/1995 | Masuda | 455/11.1 |
| 5,509,014 | * 4/1996 | Utting | 370/337 |
| 5,596,333 | * 1/1997 | Bruckert et al. | 455/562 |
| 5,666,653 | * 9/1997 | Ahl | 370/330 |
| 5,684,793 | * 11/1997 | Kiema et al. | 370/335 |
| 5,697,052 | * 12/1997 | Treatch | 455/20 |
| 5,699,380 | * 12/1997 | Sugita | 375/208 |
| 5,771,449 | * 6/1998 | Blasing et al. | 455/422 |
| 5,825,764 | * 10/1998 | Rudolph | 370/337 |
| 5,907,816 | * 5/1999 | Newman et al. | 455/562 |
| 6,108,323 | * 8/2000 | Gray | 370/335 |
| 6,108,565 | * 8/2000 | Scherzer | 455/562 |

FOREIGN PATENT DOCUMENTS

| | | |
|---|---|---|
| 96/07108 | 3/1996 | (JP) . |
| 95/09490 | 4/1995 | (WO) . |

OTHER PUBLICATIONS

R. Yamaguchi et al., "Effect of Variable Directivity Base Station Antenna for Mobile Ratio," Technical Report of IEICE, A. P95–112, EMC J 95–86, RCS95–146, MW95–163 (Feb. 1996), pp. 31–36.

European Search Report; Sept. 13, 2000.

* cited by examiner

Primary Examiner—William G. Trost
Assistant Examiner—Charles Craver
(74) Attorney, Agent, or Firm—Stevens, Davis, Miller & Moshner, L.L.P.

(57) ABSTRACT

A transmitter is provided in a base station which communicates with a mobile station of a high-speed communication user and a mobile station of a low-speed communication user according to a spread spectrum system. The transmitter includes a first antenna having a wide directivity, a second antenna having a directivity narrower than that of the first antenna, a first transmission unit for transmitting a first transmission signal from the first and second antennas to the mobile station of the low-speed communication user, and a second transmission unit for transmitting a second transmission signal from the second antenna to the mobile station of the high-speed communication user. In addition, a receiver provided in the mobile station of the low-speed communication user includes a receiving unit for receiving the first transmission signals sent from the first and second antennas of the base station, a first demodulator for despreading the received first transmission signal using a despreading code, a delay element for delaying the despreading code by the predetermined period of time, and a second demodulator for despreading the received first transmission signal using the delayed despreading code.

10 Claims, 8 Drawing Sheets

SPREAD-SPECTRUM TRANSMITTER AND RECEIVER PROVIDING SUPPRESSED INTERFERENCE BETWEEN HIGH-SPEED AND LOW-SPEED COMMUNICATION USERS

BACKGROUND OF THE INVENTION

1. Field of the Invention

The present invention relates to a transmitter and a receiver which conduct communication with each other according to a spread spectrum system, and in particular, to a transmitter which is provided in a base station and transmits a signal to a user who accomplishes a high-speed transmission via an antenna having a narrow directivity to minimize interference in other users, and to a receiver which is provided in a mobile station and in which a signal received from a sector antenna and a signal received from an antenna having a narrow directivity are both demodulated to continuously conduct communication even when there is interference by a user conducting a high-speed communication.

2. Description of the Related Art

Figure 1:
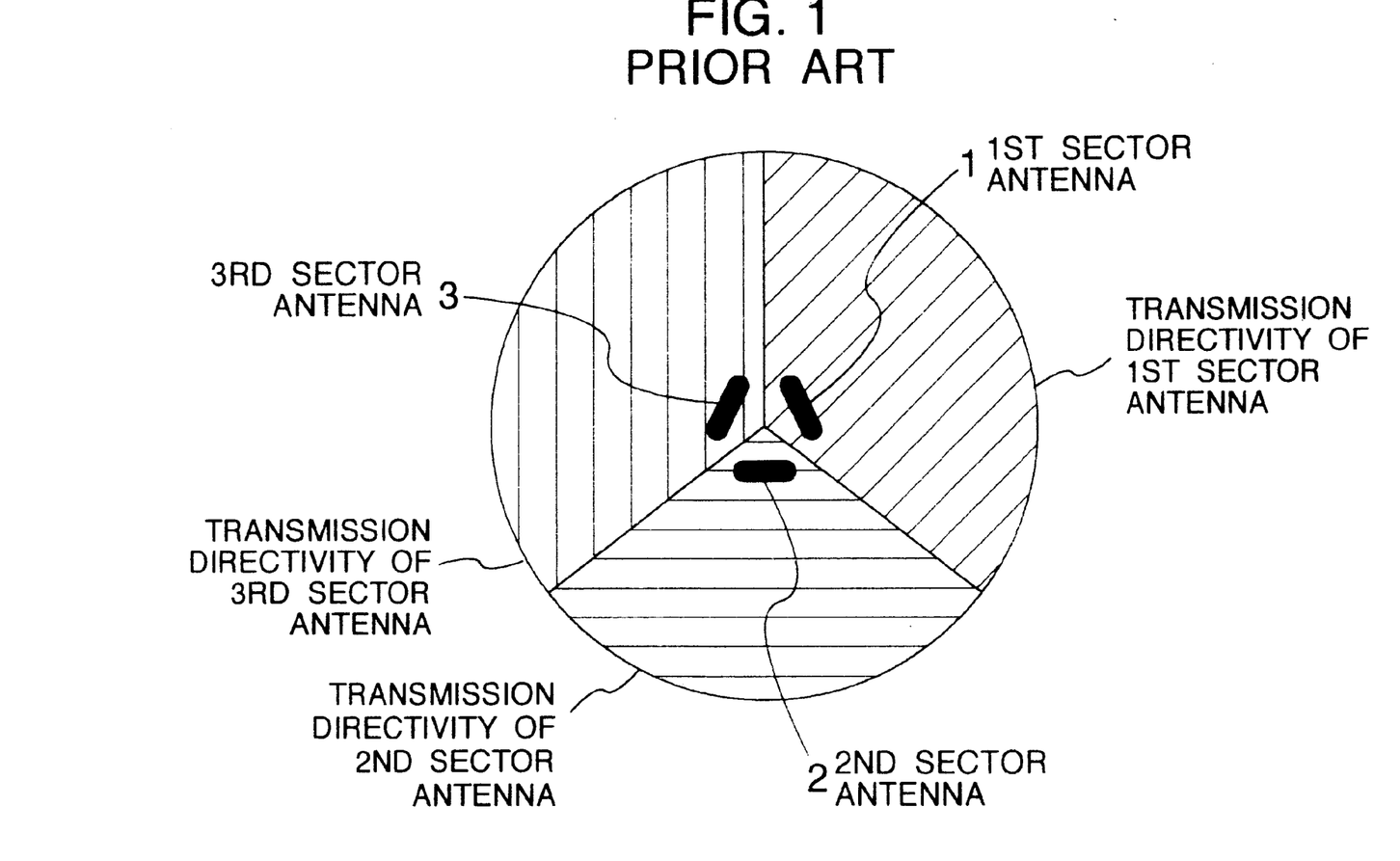
FIG. 1 is a diagram showing the transmission directivity of antennas of a conventional transmitter.
Figure 2:
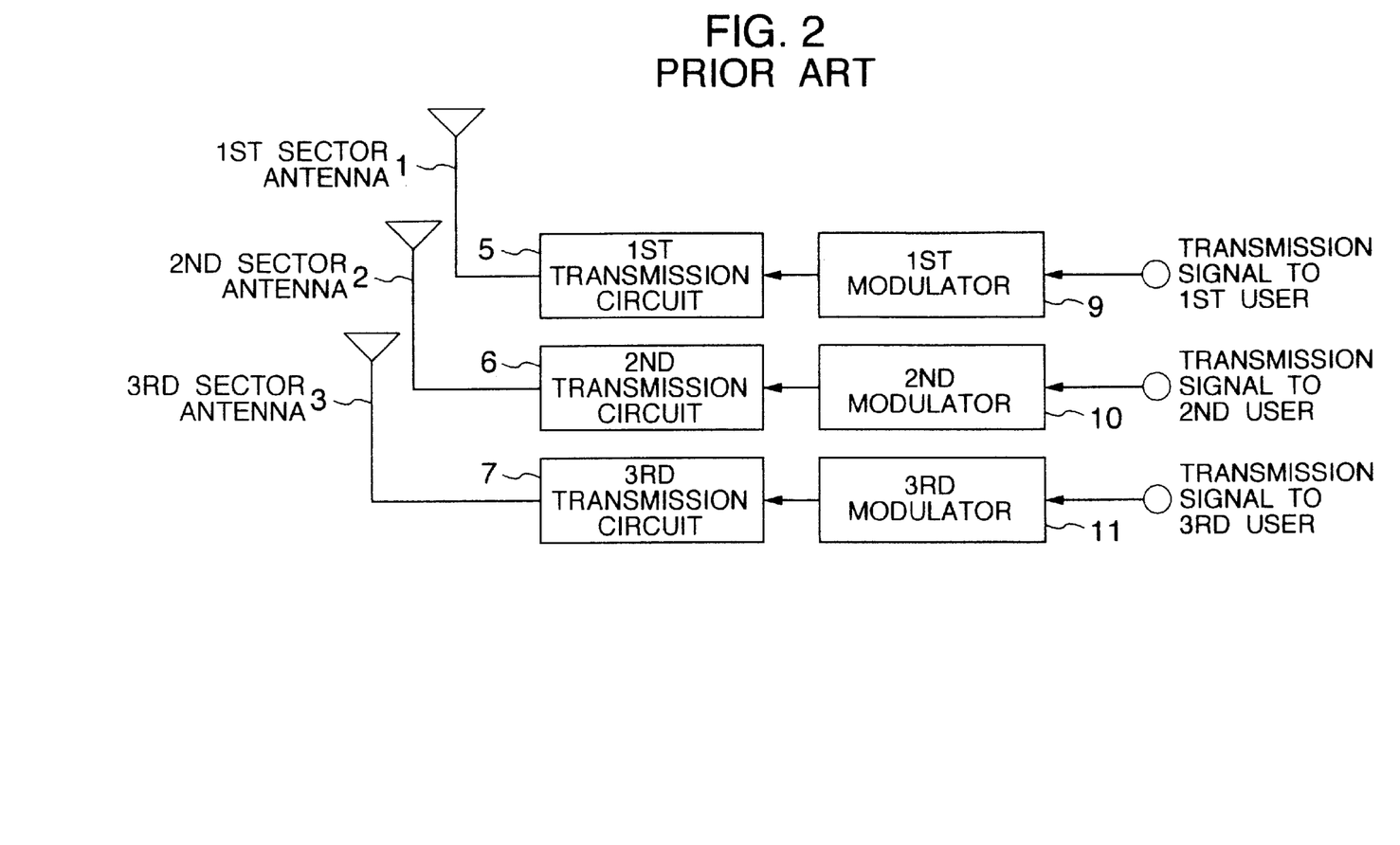
FIG. 2 is a block diagram showing a conventional transmitter.

In a code division multiple access (CDMA) communication system according to a spread spectrum system for communication of mobile stations such as car telephones and hand-held telephones, in order to support a large number of users, a service area is subdivided into a plurality of cells and each cell is further divided into a plurality of sectors. For example, one cell is subdivided into three sectors, as shown in FIG. 1. Since there are used a radio wave of the same carrier frequency and the same spreading code in each sector, the number of users to be supported can be three-times that of the users in the system in which the cell division is not adopted. For these three sectors, there are utilized first to third sector antennas 1 to 3 each having a wide directivity, each antenna being capable of conducting communication in a fan-shaped area having a central angle of 120 degrees. As shown in FIG. 2, a transmission signal to a first user in the area (first sector) of the first sector antenna 1 is quadrature-modulated in a first modulator 9 and is subjected to a frequency conversion and a power amplification in a first transmission circuit 5 to be transmitted via the first sector antenna 1. A transmission signal to a second user in the area (second sector) of the second sector antenna 2 is quadrature-modulated in a second modulator 10 and is subjected to a frequency conversion and a power amplification in a second transmission circuit 6 to be transmitted via the second sector antenna 2. Similarly, a transmission signal to a third user in the area (third sector) of the third sector antenna 3 is quadrature-modulated in a third modulator 11 and is subjected to a frequency conversion and a power amplification in a third transmission circuit 7 to be transmitted via the third sector antenna 3. Additionally, for example, when a plurality of users exist in one sector, the transmission signals to the respective users are spread with mutually different spreading codes. The resultant signals are combined with each other to be transmitted from the first sector antenna 1.

In the CDMA communication system, with the length of spreading codes kept unchanged, the communication speed can be varied by increasing or decreasing a one-symbol period of time. That is, when the one-symbol period is long, the cycle of spreading code is elongated; conversely, when the one-symbol period is short, the cycle of spreading codes is reduced. When a spreading code with a long cycle is used, the number of chips received during the one-symbol period becomes greater and hence the communication speed is lowered; however, since the reception signals can be integrated for a long period of time, the transmission power is minimized. On the other hand, when a spreading code with a short cycle is used, the number of chips received during the one-symbol period is decreased and hence the communication speed becomes higher; however, the transmission power is increased.

The low-speed communication using a spreading code having a long cycle is suitable for a voice communication or the like. Moreover, since the communication is achieved with low power and does not disturb the other users through interference, there is attained an advantage that the quality of communication is not lowered even when a large number of users conduct communication at the same time. On the other hand, the high-speed communication using a spreading code having a short cycle is suitable for the multimedia communication such as an image communication. However, since the communication is achieved with high power and considerably interferes with other users, there arises a problem that the communication can be conducted only between a small number of users. For example, even if four low-speed communication users can be supported in one sector, only one high-speed communication user can be supported. Consequently, when the high-speed communication user is in communication, the other low-speed communication users cannot conduct communication in the pertinent sector.

In order to support a high-speed communication user even when many low-speed communication users are conducting communication, the cell is conventionally subdivided into a larger number of sectors (e.g. 12 sectors) such that the high-speed communication user does not interfere with the low-speed communication users in other sectors.

However, in the conventional method, since the number of sectors is increased to minimize the amount of interference in low-speed communication users in other sectors due to the high-speed communication user, there appears a problem that the large number of sectors are to be controlled by the base station and hence the sector control operation is complicated. Furthermore, hen the sector becomes smaller, the number of hand-over operations is increased between sectors. This consequently results in a problem, namely, to achieve the hand-over operations, it is necessary to transmit the same signal to a plurality of sectors and hence the transmission power becomes higher and the amount of interference in other users is increased.

For a mobile station, since there are used quite small sectors, even when the moving distance thereof is short, the chance to make a search for a hand-over destination occurs more frequently. This leads to a problem that the hardware size becomes greater and the consumption power is increased.

SUMMARY OF THE INVENTION

An object of the present invention is to provide a transmitter and a receiver in which a high-speed communication user does not interfere with low-speed communication users even when the number of sectors is not increased.

Another object of the present invention is to provide a transmitter and a receiver in which low-speed communication users can continue communication even when there is interference due to the high-speed communication user.

To achieve the objects above, in a transmitter according to the present invention, an antenna having a narrow directivity (a beam antenna) is used for a high-speed communication user considerably interfering with other users, thereby minimizing the amount of interference in the other users.

Furthermore, for a user in a direction equal to that of the high-speed communication user (i.e. a user in an area to receive the signal from the antenna having a narrow directivity), a signal which is identical to a signal transmitted from an antenna having a wide directivity (a sector antenna) is transmitted also from the antenna having a narrow directivity, thereby improving the characteristic against interference waves. In this connection, when the same signals are simultaneously transmitted from two antennas, there may occur an event that the signals cannot be received due to interference therebetween. In consequence, the signal transmitted from the antenna having a narrow directivity (the beam antenna) is delayed in time relative to that transmitted from the antenna having a wide directivity (the sector antenna) to thereby prevent the event in which these two signals having mutually opposing phases are added to each other and are resultantly canceled with each other.

A receiver according to the present invention receives, for a low-speed communication user interfered by a high-speed communication user, a signal from a sector antenna and a signal from a beam antenna, and despreads these two signals to demodulate them and combine the resultant signals with each other. Due to this operation, the user can continue the communication even when there is interference by the high-speed communication user. Additionally, the receiver of the present invention monitors, for the low-speed communication user, the amount of interference. The despreading operation of the signal received from the beam antenna is started when an abrupt increase is detected in the amount of interference. Moreover, the despreading operation of the reception signal from the beam antenna is stopped at detection of an abrupt decrease in the interference. Due to this provision, it is possible to save the consumption power when the low-speed communication user is not interfered.

According to the present invention, there is provided a transmitter which is provided in a base station conducting communication according to a spread spectrum system with a mobile station of a high-speed communication user and a mobile station of a low-speed communication user. The transmitter includes a first antenna having a wide directivity, a second antenna having a directivity narrower than that of the first antenna, first transmitting means for transmitting a first transmission signal from the first and second antennas to the mobile station of the low-speed communication user, and second transmitting means for transmitting a second transmission signal from the second antenna to the mobile station of the high-speed communication user.

In this connection, the first transmitting means may includes means for delaying the transmission of the first transmission signal from the first antenna by a predetermined period of time relative to the transmission of the first signal transmitted from the second antenna.

According to the present invention, there is provided a first receiver which is provided in a mobile station of a low-speed communication user conducting communication according to a spreading spectrum system with a base station which transmits a first transmission signal to the mobile station of the low-speed communication user from a first antenna having a wide directivity and a second antenna having a directivity narrower than that of the first antenna and which transmits a second transmission signal to a mobile station of a high-speed communication user from the second antenna, the first transmission signal transmitted from the first antenna being delayed by a predetermined period of time relative to the first transmission signal transmitted from the second antenna. The receiver includes receiving means for receiving the first transmission signals respectively sent from the first and second antennas of the base station, first demodulating means for despreading the received first transmission signal using a despreading code, delaying means for delaying the despreading code by the predetermined period of time, and second demodulating means for despreading the received first transmission signal using the delayed despreading code.

According to the present invention, there is provided a second receiver further including, in addition to the components of the first receiver, interference detecting means for detecting an amount of interference in accordance with an output signal of the first demodulating means and starting operation of the delaying means and the second demodulating means when the amount of interference abruptly increases.

According to the present invention, there is provided a third receiver further including, in addition to the components of the first receiver, interference detecting means for detecting an amount of interference in accordance with an output signal of the first demodulating means and stopping the operation of the delaying means and the second demodulating means when the amount of interference abruptly decreases.

BRIEF DESCRIPTION OF THE DRAWINGS

The above objects and features of the present invention will become more apparent from the consideration of the following detailed description taken in conjunction with the accompanying drawings in which.

DESCRIPTION OF THE PREFERRED EMBODIMENTS (Transmitter according to a first embodiment)

Figure 3:
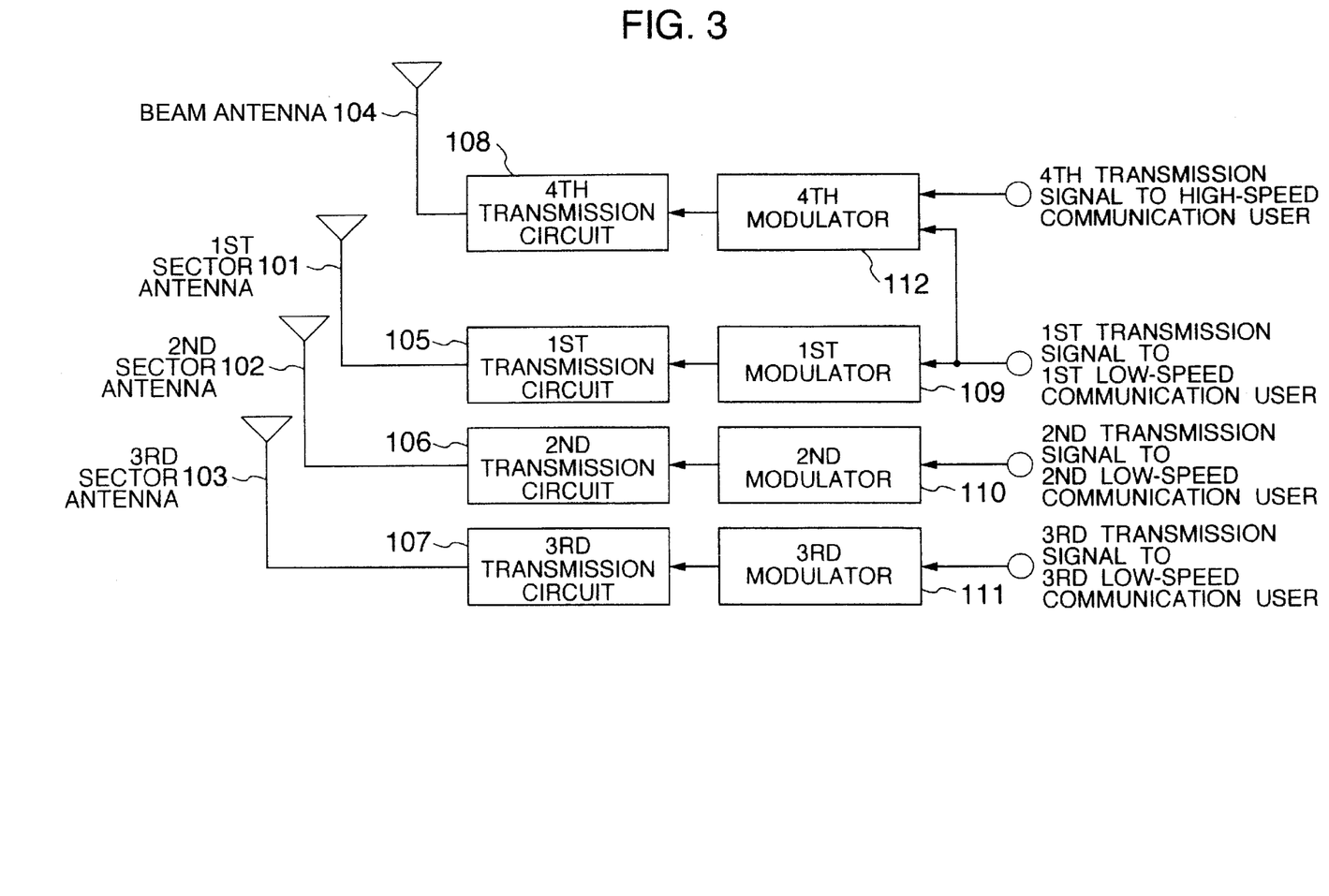
FIG. 3 is a block diagram showing a transmitter according to a first embodiment of the present invention.
Figure 4:
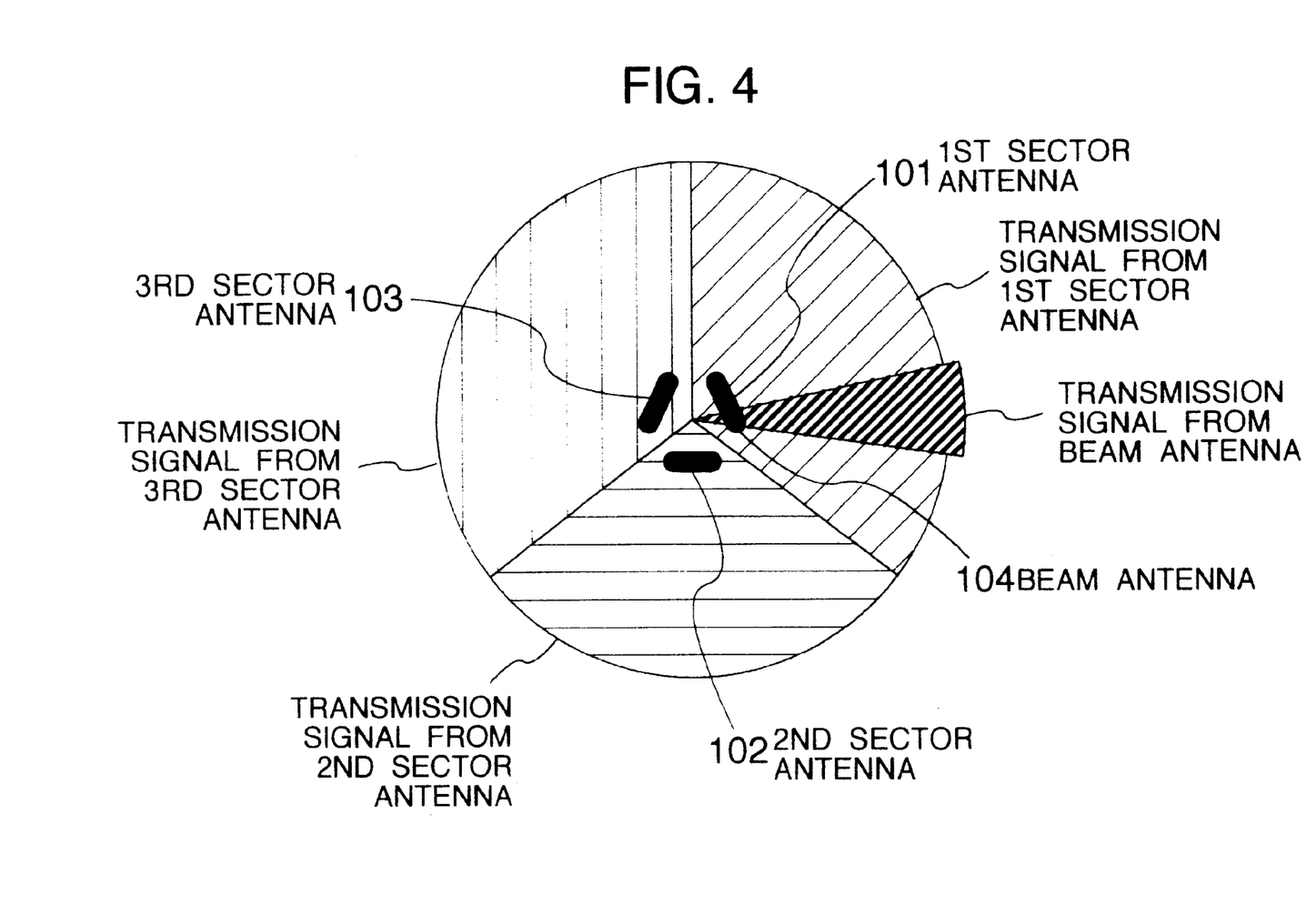
FIG. 4 is a diagram showing transmission areas of antennas shown in FIG. 3.

The transmitter according to a first embodiment of the present invention includes first to third sector antennas 101 to 103 each having a wide directivity, a beam antenna 104 having a narrow directivity, first to fourth transmission circuits 105 to 108, and first to fourth modulators 109 to 112, as shown in FIG. 3. In the configuration, the directivity of each of the sector antennas 101 to 103 is selected to cover a cell subdivided into three sectors. That is, the first sector antenna 101 has the directivity to cover a first sector which is a fan-shaped communication area having a central angle of 120 degrees, the second sector antenna 102 has the directivity to cover a second sector which is a fan-shaped communication area having a central angle of 120 degrees, and the third sector antenna 103 has the directivity to cover a third sector which is a fan-shaped communication area having a central angle of 120 degrees. The beam antenna 104 has a narrow directivity overlapped with the directivity of each of the first to third sector antennas 101 to 103. Moreover, in order to trace a high-speed communication user, there may be adopted as the beam antenna 104 ten to twenty antennas each having a fixed directivity, the antennas being used through change-over operations therebetween. Alternatively, there may be adopted a phased array antenna.

Description will be now given of the operation of the transmitter in an example in which first to third transmission signals are sent to first to third low-speed communication users existing in the first to third sectors, respectively and a fourth transmission signal is sent to a high-speed communication user existing in the first sector.

The first transmission signal to the first low-speed communication user in the first sector is quadrature-modulated in the first modulator 109 and is subjected to a frequency conversion and a power amplification in the first transmission circuit 105 to be transmitted from the first sector antenna 101. Furthermore, the first transmission signal to the first low-speed communication user is combined in the fourth modulator 112 with the fourth transmission signal to the high-speed communication user in the first sector to be then quadrature-modulated. The first and fourth transmission signals having undergone the combining operation and the quadrature modulation are subjected to a frequency conversion and a power amplification in the fourth transmission circuit 108 to be transmitted from the beam antenna 104. The second transmission signal to the second low-speed communication user in the second sector is quadrature-modulated in the second modulator 110 and is subjected to a frequency conversion and a power amplification in the second transmission circuit 106 to be transmitted from the second sector antenna 102. The third transmission signal to the third low-speed communication user in the third sector is quadrature-modulated in the third modulator 111 and is subjected to a frequency conversion and a power amplification in the third transmission circuit 107 to be transmitted from the third sector antenna 103.

According to the transmitter of this embodiment, since the first transmission signal is sent from the first sector antenna 101 and the beam antenna 104 to the low-speed communication user in the first sector, the total power of these signals is increased in comparison with the case in which the first transmission signal is sent only from the first sector antenna 101. As a result, in the first low-speed communication user, the interference by the high-speed communication user is relatively reduced. In consequence, if the transmission power of the beam antenna 104 is adjusted such that the communication of the first low-speed communication user is not interrupted by the interference of the high-speed communication user, the first low-speed communication user can continue the communication. Incidentally, since the power is increased within the narrow beam zone, there does not occur any disturbance of any low-speed communication users existing beyond the range of the directivity of the beam antenna 104 in the first sector.

(Transmitter according to a second embodiment)

Figure 5:
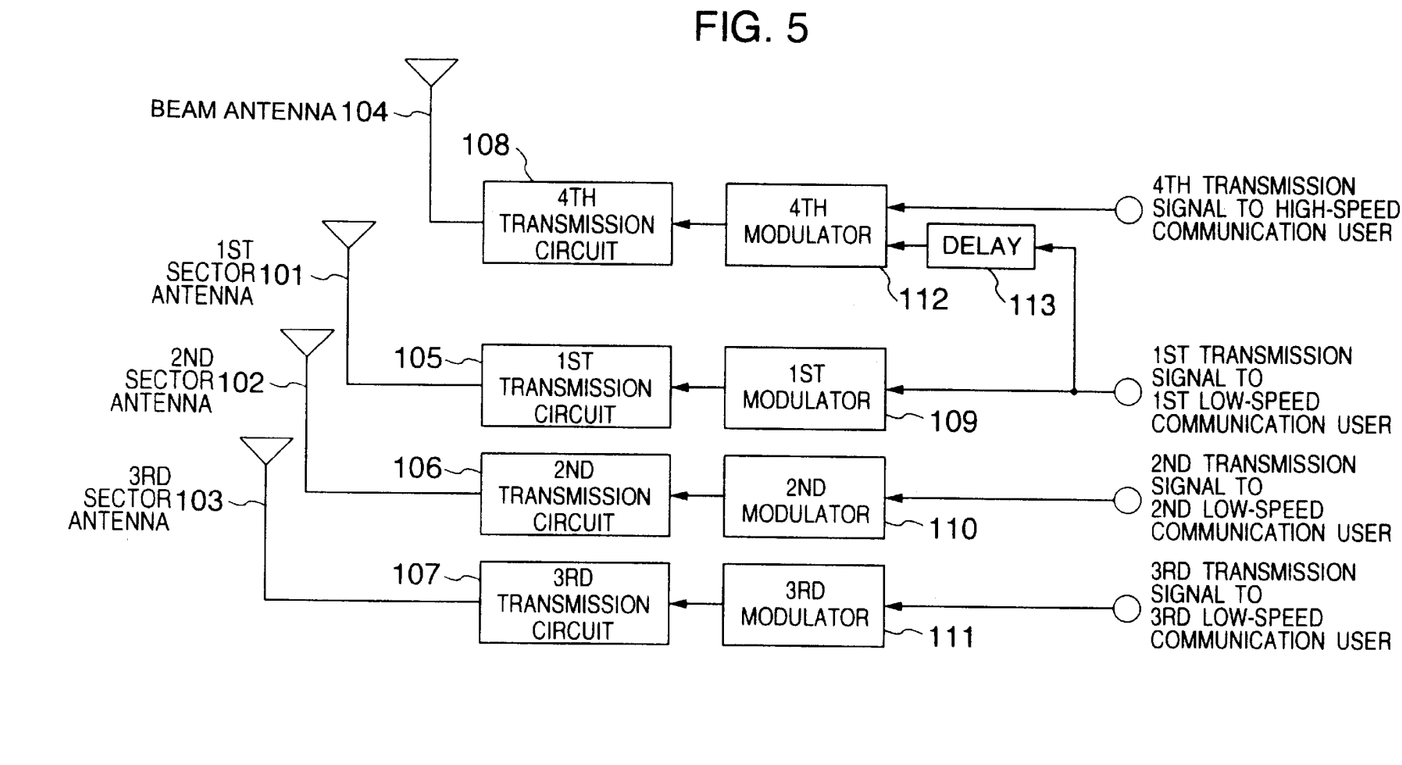
FIG. 5 is a block diagram showing a transmitter according to a second embodiment of the present invention.

The transmitter in the second embodiment of the present invention differs from that according to the first embodiment in that there is included a delay circuit 113 which delays the first transmission signal to the first low-speed communication user by a predetermined period of time and supplies the delayed signal to the fourth modulator 112.

Next, description will be given of the operation of the transmitter according to the second embodiment in an example in which the first to third signals are respectively sent to the first to third low-speed communication users who exist in the first to third sectors, respectively, and the fourth transmission signal is sent to the high-speed communication user who exists in the first sector.

The first transmission signal to the first low-speed communication user in the first sector is quadrature-modulated in the first modulator 109 and is subjected to a frequency conversion and a power amplification in the first transmission circuit 105 and then the resultant signal is sent from the first sector antenna 101. Additionally, the first transmission signal to the first low-speed communication user is delayed by a predetermined period of time (e.g., a one-symbol period) in the delay circuit 113. The delayed first transmission signal is then combined in the fourth modulator 112 with the fourth transmission signal to the high-speed communication user in the first sector to be then quadrature-modulated. The first and fourth transmission signals thus undergone the combining operation and the quadrature modulation are subjected to a frequency conversion and a power amplification in the fourth transmission circuit 108 to be transmitted from the beam antenna 104. The second transmission signal to the second low-speed communication user in the second sector is quadrature-modulated in the second modulator 110 and is subjected to a frequency conversion and a power amplification in the second transmission circuit 106, and then the obtained signal is sent from the second sector antenna 102. The third transmission signal to the third low-speed communication user in the third sector is quadrature-modulated in the third modulator 111 and is subjected to a frequency conversion and a power amplification in the third transmission circuit 107 to be transmitted from the third sector antenna 103.

According to the transmitter of this embodiment, the first transmission signal is sent from the first sector antenna 101 and the beam antenna 104 to the low-speed communication user in the first sector, and hence the total power of these signals is increased when compared with the case in which the first transmission signal is transmitted only from the first sector antenna 101. Resultantly, in the first low-speed communication user, the interference of the high-speed communication user is relatively minimized. In consequence, if the transmission power of the beam antenna 104 is adjusted to an extent in which the communication of the first low-speed communication user is not interrupted by the interference of the high-speed communication user, the first low-speed communication user can continue the communication. In this connection, since the power is increased within the narrow beam zone, there does not occur any disturbance of any low-speed communication users who exist beyond the range of directivity of the beam antenna 104 in the first sector.

Figure 6:
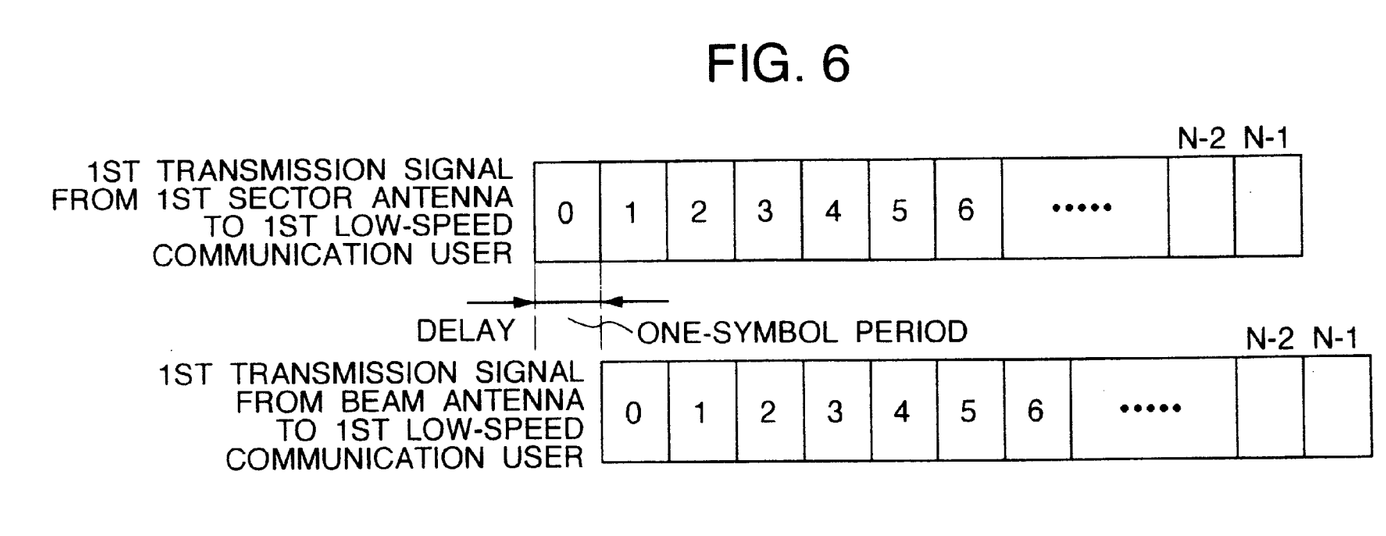
FIG. 6 is a diagram showing transmission signals in the transmitter of FIG. 5.

Furthermore, when the first transmission signal is simultaneously sent from the first sector antenna 101 and the beam antenna 104, there may occur an event in the first low-speed communication user in which these signals from the antennas 101 and 104 having opposing phases are added to each other through interference therebetween and the reception signal level becomes zero. To cope therewith, in the transmitter of this embodiment, the first transmission signal from the beam antenna 104 is delayed by a predetermined period of time relative to the first transmission signal from the first sector antenna 101 to thereby prevent the decrease in the reception signal level. For example, when the first transmission signal from the beam antenna 104 is delayed by a one-symbol period of time relative to the first transmission signal from the first sector antenna 101 as shown in FIG. 6, the event in which the signals having opposing phases are added to each other through the interference therebetween to obtain a reception signal level of zero can be prevented, and hence it is possible to conduct communication in a stable state. When the delay time of the first transmission signal is too long, the demodulation of the signals becomes difficult; whereas, when the delay time is too short, the interference occurs easily between the first transmission signals respectively sent from the antenna 101 and 104. Therefore, the delay time is appropriately set to about the one-symbol period.

(Receiver according to a first embodiment)

Figure 7:
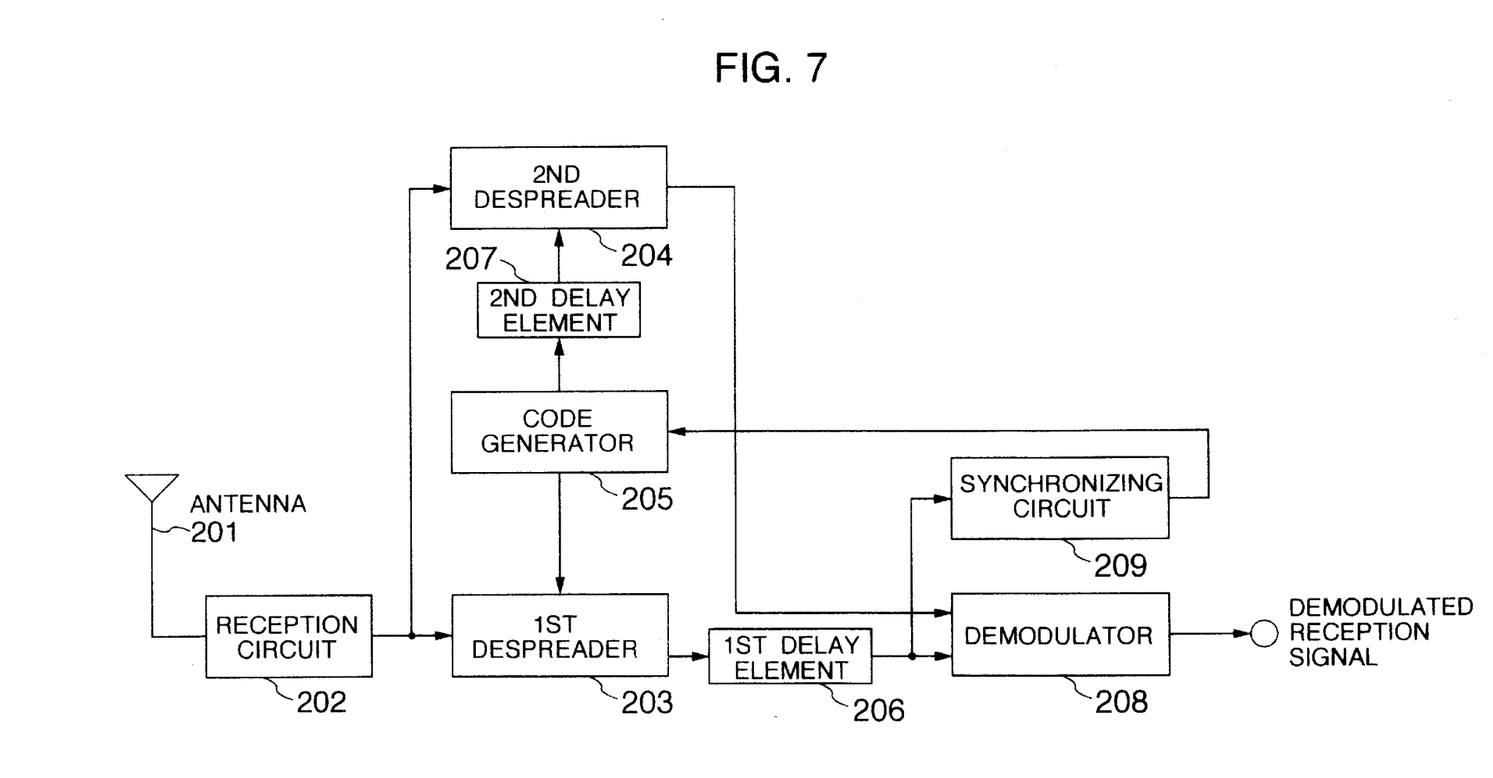
FIG. 7 is a block diagram showing a receiver according to a first embodiment of the present invention.

A receiver according to a first embodiment of the present invention includes an antenna 201, a reception circuit 202, first and second despreaders 203 and 204, a code generator 205, first and second delay circuits 206 and 207, a demodulator 208, and a synchronizing circuit 209, as shown in FIG. 7.

In the receiver of the embodiment, a high-frequency signal received by the antenna 201 undergoes a frequency conversion and a quadrature-detection in the reception circuit 202 to be converted into a base-band signal. The base-band signal is despread by the first despreader 203 using a despreading code produced from the code generator 205 to be converted into a first despread signal. Furthermore, the base-band signal is despread by the second despreader 204 using a delayed despreading code obtained by delaying the despreading code by a predetermined period of time in the second delay circuit 207 to be converted into a second despread signal. The first despread signal is delayed by a predetermined period of time in the first delay circuit 206, and then the delayed signal is added to the second despread signal in the demodulator 208 for demodulation thereof to thereby attain a demodulated reception signal. The first despread signal delayed by a predetermined period of time through the first delay circuit 206 undergoes a correlational operation in the synchronizing circuit 209 to make a search for a synchronized phase. A synchronizing signal thus obtained from the synchronizing circuit 209 is outputted to the code generator 205.

Next, description will be given of the operation of the receiver in the embodiment to receive the first transmission signals which are transmitted from the first sector antenna 101 and the beam antenna 104 of the transmitter shown in FIG. 5, respectively. In this regard, it is assumed that the first transmission signal sent from the beam antenna 104 is delayed by the one-symbol period relative to that sent from the first sector antenna 101 as shown in FIG. 6.

A high-frequency signal received by the antenna 201 is subjected to a frequency conversion and a quadrature-detection in the reception circuit 202 to be converted into a base-band signal. The base-band signal is despread in the first despreader 203 using a despreading code produced from the code generator 205 to be converted into a first despread signal. In this operation, since the code generator 205 is controlled by the synchronizing circuit 209 to generate the despreading code such that it has a phase synchronized with a phase of the first transmission signal from the first sector antenna 101, the first despread signal corresponds to the first transmission signal from the first sector antenna 101. Additionally, the base-band signal is despread in the second despreader 204 using a delayed despreading code obtained by delaying the despread code by the one-symbol period in the second delay circuit 207 to be converted into a second despread signal. In this situation, since the phase of the delayed despreading code delayed by the one-symbol period is synchronized with that of the first transmission signal from the beam antenna 104, the second despread signal corresponds to the first transmission signal from the beam antenna 104.

The first despread signal corresponding to the first transmission signal from the first sector antenna 101 is delayed by the one-symbol period in the first delay circuit 206, and then the delayed signal is added to the second despread signal corresponding to the first transmission signal from the beam antenna 104 in the demodulator 208 for demodulation thereof. The demodulated reception signal thus obtained has a level which is higher than the level of the pertinent reception signal obtained when the first transmission signal is sent only from the first sector antenna 101. Resultantly, the interference caused by the high-speed communication user is relatively minimized.

In accordance with the receiver of the embodiment described above, using a predetermined time difference between the signals respectively sent from the sector antenna and the beam antenna, the signals respectively sent from the sector antenna and the beam antenna are respectively despread with two despreading codes associated with the predetermined time difference and then the despread signals with each other for the demodulation thereof. Consequently, the low-speed communication user can correctly receive the transmission signals even when there is interference by the high-speed communication user conducting communication with a high power. In addition, the synchronizing circuit 209 is not required to accomplish the search operation for phases of signals of a plurality of paths, which is required, e.g., in a RAKE circuit, the configuration of synchronizing circuit 209 is simplified.

In this regard, although the values of delay time are fixed (e.g., one-symbol period) in the first and second delay circuits 206 and 207 in the description above, there may be provided a circuit which receives values of delay time sent from the base station to set the values to the first and second delay circuits 206 and 207.

(Receiver according to a second embodiment)

Figure 8:
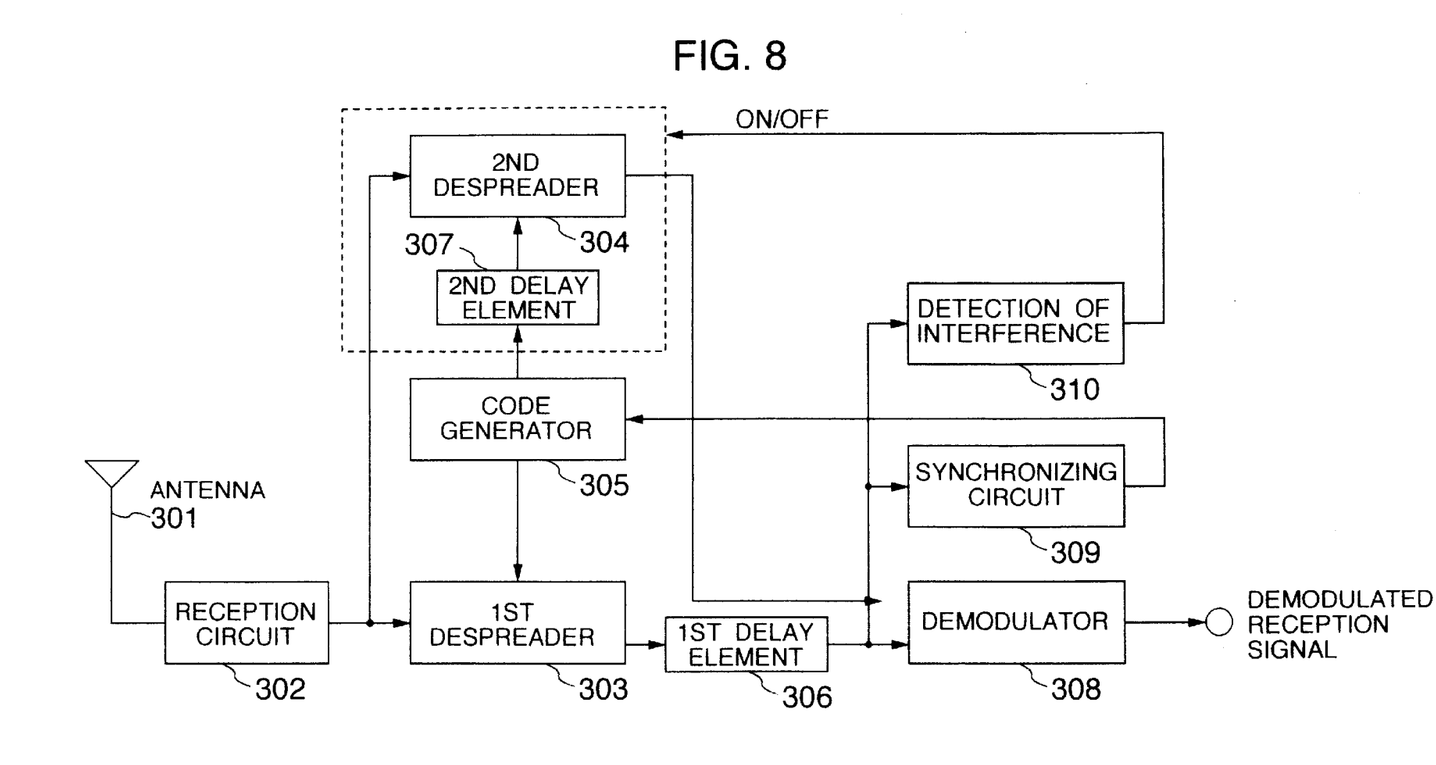
FIG. 8 is a block diagram showing a receiver according to second and third embodiments of the present invention.

A receiver according to a second embodiment of the present invention is differed from that according to the first embodiment in that there is included an interference detection circuit 310 which detects whether or not an abrupt increase occurs in the amount of interference using a first despread signal outputted from a first despreader 303 and which activates a second delay circuit 307 and a second despreader 304 when the abrupt increase is detected as shown in FIG. 8.

Next, description will be given of the operation of the receiver according to this embodiment to receive the first signals respectively sent from the first sector antenna 101 and the beam antenna 104 of the transmitter shown in FIG. 5. In this connection, it is assumed that the first transmission signal from the beam antenna 104 is delayed by the one-symbol period relative to that transmitted from the first sector antenna 101 as shown in FIG. 6. In the initial state, the second delay circuit 307 and the second despreader 304 are in a non-operative state.

A high-frequency signal received by an antenna 301 is subjected to a frequency conversion and a quadrature-detection in a reception circuit 302 to be converted into a base-band signal. The base-band signal is despread in a first despreader 303 using a despreading code produced from a code generator 305 to be converted into a first despread signal. In this operation, since the code generator 305 is controlled by a synchronizing circuit 309 to generate the despreading code such that it has a phase synchronized with a phase of the first transmission signal sent from the first sector antenna 101, the first despread signal corresponds to the first transmission signal from the first sector antenna 101. The first despread signal is delayed by one-symbol period through the first delay circuit 306 to be fed to a demodulator 308, the synchronizing circuit 309, and the interference detection circuit 310. The detection circuit 310 detects whether or not an abrupt increase occurs in the amount of interference in accordance with the first despread signal. The abrupt increase in interference is determined, for example, by attaining a differential value of the level of the first despread signal.

When the abrupt increase is not detected in the interference detection circuit 310, the second delay circuit 307 and the second despreader 304 are kept in the non-operative state. Moreover, the first despread signal is demodulated in the demodulator 308.

On the other hand, when the abrupt increase is detected in the interference detection circuit 310, the second delay circuit 307 and the second despreader 304 are set to an operative state. As a result, the base-band signal from the reception circuit 302 is despread in the second despreader 304 using a delayed despreading code obtained by delaying the despread code by the one-symbol period in the second delay circuit 307 to be converted into a second despread signal. In this situation, the phase of the delayed despreading code is synchronized with that of the first transmission signal sent from the beam antenna 104, the second despread signal corresponds to the first transmission signal sent from the beam antenna 104. The second despread signal is added to the first despread signal, and then the obtained signal is demodulated in the demodulator 308.

Consequently, when a low-speed communication user adopting the receiver of the embodiment is beyond the range of directivity of the beam antenna 104, the interference caused by the high-speed communication user is reduced and hence the interference detection circuit 310 keeps the second delay circuit 307 and the second despreader 304 in the non-operative state. In addition, even when the amount of interference is gradually changed due to a variation in the communication state such as a phasing operation, the interference detection circuit 310 keeps the second delay circuit 307 and the second despreader 304 in the non-operative state.

On the other hand, when the low-speed communication user utilizing the receiver of the embodiment is within the range of directivity of the beam antenna 104 or approaches the range, the interference by the high-speed communication user abruptly increases and hence the interference detection circuit 310 sets the second delay circuit 307 and the second despreader 304 to the operative state. Resultantly, since the first transmission signal is demodulated in the demodulator 308 using the first and second despread signals, the level of the demodulated reception signal is higher than that obtained when the first transmission signal is sent only from the first sector antenna 101. Therefore, the interference caused by the high-speed communication user is relatively minimized. With this provision, since the low-speed communication user can correctly receive the transmission signals even when there is interference by the high-speed communication user accomplishing communication with a high power, it is possible for the low-speed communication user to continue the communication.

As described above, according to the receiver of the embodiment, only when the amount of interference is abruptly increased, the second delay circuit 307 and the second despreader 304 are operated, which advantageously minimizes the consumption power of the receiver.

In the description above, although the values of delay time are fixed (e.g., one-symbol period) for the first and second delay circuits 306 and 307, there may be provided a circuit which receives values of the delay time sent from the base station to set the values to the delay circuits 306 and 307. Additionally, although the signal outputted from the first delay circuit 306 is inputted to the interference detection circuit 310, it is also possible to supply the signal from the first despreader 303 to the detection circuit 310. Furthermore, the abrupt increase in the amount of interference may be determined in accordance with a ratio in intensity of the signal sent to the high-speed communication user to that of the signal to the low-speed communication user. Alternatively, the abrupt increase may be determined on the basis of the difference between the mean values of the detected amounts of interference.

The threshold value to detect the abrupt increase in the amount of interference in the interference detection circuit 310 may be a fixed value. However, to prevent the second delay circuit 307 and the second despread circuit 304 from frequently turning on and off in the vicinity of the threshold value, it is favorable to provide an appropriate hysteresis.

(Receiver according to a third embodiment)

A receiver according to a third embodiment of the present invention is similar in constitution to that according to the second embodiment shown in FIG. 8. However, the former differs from the latter in that the interference detection circuit 310 detects an abrupt decrease in the amount of interference using the first despread signal outputted from the first despreader 303 and stops, at detection of the abrupt decrease, the operation of the second delay circuit 307 and the second despreader 304.

Referring now to FIG. 8, description will be given of the operation of the receiver in the embodiment to receive the first signals respectively transmitted from the first sector antenna 101 and the beam antenna 104 of the transmitter shown in FIG. 5. In this regard, it is assumed that the first transmission signal from the beam antenna 104 is delayed by the one-symbol period relative to that transmitted from the first sector antenna 101 as shown in FIG. 6. In the initial state, the second delay circuit 307 and the second despreader 304 are in the operative state.

A high-frequency signal received by the antenna 301 is subjected to a frequency conversion and a quadrature-detection in the reception circuit 302 to be converted into a base-band signal. The base-band signal is despread in the first despreader 303 using a despreading code generated from a code generator 305 to be converted into a first despread signal. In this operation, since the code generator 305 is controlled by the synchronizing circuit 309 to generate the despreading code such that it has a phase synchronized with a phase of the first transmission signal sent from the first sector antenna 101, the first despread signal corresponds to the first transmission signal from the first sector antenna 101. The first despread signal is delayed by the one-symbol period through the first delay circuit 306 to be fed to the demodulator 308, the synchronizing circuit 309, and the interference detection circuit 310. The detection circuit 310 detects whether or not an abrupt decrease occurs in the amount of interference using the first despread signal. The abrupt decrease in interference is determined, for example, by attaining a differential value of the level of the first despread signal.

When the abrupt decrease is not detected in the interference detection circuit 310, the second delay circuit 307 and the second despreader 304 are kept in the operative state. As a result, the base-band signal from the reception circuit 302 is despread by the second despreader 304 using a delayed despreading code obtained by delaying the despreading code by the one-symbol period in the second delay circuit 307 to be converted into a second despread signal. In this situation, since the phase of the delayed despreading code is synchronized with that of the first transmission signal sent from the beam antenna 104, the second despread signal corresponds to the first transmission signal from the beam antenna 104. The second despread signal is added to the first despread signal, and then the obtained signal is demodulated in the demodulator 308.

On the other hand, when the abrupt decrease is detected in the interference detection circuit 310, the second delay circuit 307 and the second despreader 304 are deactivated into a non-operative state. Resultantly, only the first despread signal is demodulated in the demodulator 308.

That is, when a low-speed communication user having the receiver of the embodiment leaves the range of directivity of the beam antenna 104, the interference caused by the high-speed communication user is remarkably reduced and the first transmission signal from the beam antenna 104 is not received. In this state, since the despreading of the first transmission signal not received leads to waste of power consumption, the interference detection circuit 310 sets the second delay circuit 307 and the second despreader 304 to the non-operative state.

On the other hand, when the low-speed communication user having the receiver of the embodiment is existing in the range of directivity of the beam antenna 104, the interference caused by the high-speed communication user does not abruptly decrease, and hence the interference detection circuit 310 sets the second delay circuit 307 and the second despreader 304 to the operative state. Resultantly, since the first transmission signal is demodulated in the demodulator 308 using the first and second despread signals, the level of the demodulated reception signal becomes higher than that obtained when the first transmission signal is sent only from the first sector antenna 101. Therefore, the interference by the high-speed communication user is relatively reduced. Due to this provision, since the low-speed communication user can correctly receive the transmission signals even when there is interference by the high-speed communication user accomplishing communication with a high power, it is possible for the low-speed communication user to continue the communication.

As described above, according to the receiver of this embodiment, only when the amount of interference is abruptly decreased, the second delay circuit 307 and the second despreader 304 are deactivated, which advantageously minimizes the consumption power of the receiver.

In the description above, although the delay time is fixed (e.g., one-symbol period) for each of the first and second delay circuits 306 and 307, there may be provided a circuit which receives values of the delay time sent from the base station and which sets the values to the delay circuits 306 and 307. Moreover, although the signal outputted from the first delay circuit 306 is inputted to the interference detection circuit 310, the signal from the first despreader 303 may be fed to the detection circuit 310. Furthermore, the abrupt decrease in the amount of interference may be determined in accordance with a ratio in intensity of the signal sent to the high-speed communication user to that of the signal transmitted to the low-speed communication user. Or, the abrupt increase may be determined on the basis of the difference between the mean values of the detected amounts of interference.

The threshold value to detect the abrupt decrease in the amount of interference in the interference detection circuit 310 may be a fixed value. However, to prevent the second delay circuit 307 and the second despread circuit 304 from frequently turning on and off in the proximity of the threshold value, it is favorable to provide an appropriate hysteresis.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A transmitter for being provided in a base station conducting communication with a mobile station of a high-speed communication user and a mobile station of a low-speed communication user according to a spread spectrum system, said transmitter comprising:

a first antenna having a wide directivity;

a second antenna having a directivity narrower than that of the first antenna;

transmitting means for, when both said mobile station of said low-speed communication user and said mobile station of said high-speed communication user are located within an area to receive a signal from said second antenna, transmitting (i) a first transmission signal from the first and second antennas to the mobile station of the low-speed communication user and (ii) a second transmission signal, different from said first transmission signal, from the second antenna to the mobile station of the high-speed communication user.

2. A transmitter according to claim 1, wherein the first transmitting means includes means for delaying the transmission of the first transmission signal from the first antenna by a predetermined period of time relative to the transmission of the first transmission signal transmitted from the second antenna.

3. A receiver for being provided in a mobile station of a low-speed communication user conducting communication with a base station which includes a first antenna having a wide directivity and a second antenna having a directivity narrower than that of the first antenna, which conducts communication with said mobile station of said low-speed communication user and a mobile station of a high-speed communication user according to a spread spectrum system and which, when both said mobile station of said low-speed communication user and said mobile station of said high-speed communication user are located within an area to receive a signal from said second antenna, transmits (i) first transmission signals to the mobile station of the low-speed communication user from said first antenna and said second antenna and (ii) second transmission signals, different from said first transmission signals, to said mobile station of said high-speed communication user from the second antenna, while the first transmission signal transmitted from the first antenna is delayed by a predetermined period of time relative to the first transmission signal transmitted from the second antenna, said receiver comprising:

receiving means for receiving the first transmission signals which are sent from the first and second antennas of the base station, respectively;

first demodulating means for despreading the received first transmission signal from said second antenna using a despreading code;

delaying means for delaying the despreading code by the predetermined period of time; and second demodulating means for despreading the received first transmission signal from said first antenna using the delayed despreading code.

4. A receiver according to claim 3, further including interference detecting means for detecting an amount of interference using an output signal from the first demodulating means and starting operation of the delaying means and the second demodulating means when the amount of interference abruptly increases.

5. A receiver according to claim 3, further including interference detecting means for detecting an amount of interference using an output signal from the first demodulating means and stopping operation of the delaying means and the second demodulating means when the amount of interference abruptly decreases.

6. A transmitter for being provided in a base station conducting communication with a mobile station of a high-speed communication user and a mobile station of a low-speed communication user according to a spread spectrum system, said transmitter comprising:

a first antenna having a wide directivity;

a second antenna having a directivity narrower than that of the first antenna;

transmitting means for, when both said mobile station of said low-speed communication user and said mobile station of said high-speed communication user are located within an area to receive a signal from said second antenna, transmitting (i) a first transmission signal from the first and second antennas to the mobile station of the low-speed communication user and (ii) a combined signal from the second antenna, said combined signal resulting from combining the first transmission signal with a second transmission signal to be sent to the mobile station of the high-speed communication user.

7. A transmitter according to claim 6, wherein the second transmitting means includes means for delaying the first transmission signal by a predetermined period of time and combining the delayed first transmission signal with the second transmission signal.

8. A receiver for being provided in a mobile station of a low-speed communication user conducting communication with a base station which includes a first antenna having a wide directivity and a second antenna having a directivity narrower than that of the first antenna, which conducts communication with said mobile station of said low-speed communication user and a mobile station of a high-speed communication user according to a spread spectrum system, and which, when both said mobile station of said low-speed communication user and said mobile station of said high-speed communication user are located within an area to receive a signal from said second antenna, transmits (i) first transmission signals to the mobile station of the low-speed communication user from said first antenna and said second antenna and (ii) second transmission signals, different from said first transmission signals, to said mobile station of said high-speed communication user from the second antenna, while the first transmission signal transmitted from the first antenna is delayed by a predetermined period of time relative to the first transmission signal transmitted from the second antenna, said receiver comprising:

an antenna for receiving the first transmission signals which are sent from the first and second antennas of the base station, respectively;

first despreading means for despreading the received first transmission signal from said second antenna using a despreading code to be converted into a first despread signal;

first delaying means for delaying the first despread signal by the predetermined period of time;

second delaying means for delaying the despreading code by the predetermined period of time;

second despreading means for despreading the received first transmission signal from said first antenna using the delayed despreading code obtained from the second delaying means to be converted into a second despread signal; and demodulating means for combining the first despread signal delayed in the first delaying means with the second despread signal and thereby demodulating the first transmission signal.

9. A receiver according to claim 8, further including interference detecting means for detecting an amount of interference using the first despread signal and starting operation of the second delaying means and the second despreading means when the amount of interference abruptly increases.

10. A receiver according to claim 8, further including interference detecting means for detecting an amount of interference using the first despread signal and stopping operation of the second delaying means and the second despreading means when the amount of interference abruptly decreases.

* * * * *